United States Patent
Williamson et al.

(10) Patent No.: US 7,577,061 B2
(45) Date of Patent: Aug. 18, 2009

(54) PROCESS AND PROGRAM FOR CHARACTERISING EVOLUTION OF AN OIL RESERVOIR OVER TIME

(75) Inventors: Paul Williamson, Houston, TX (US); Paul Sexton, Northwich (GB); Adam John Cherrett, Lons (FR)

(73) Assignee: Total S.A., Courbevoie (FR)

( * ) Notice: Subject to any disclaimer, the term of this patent is extended or adjusted under 35 U.S.C. 154(b) by 198 days.

(21) Appl. No.: 11/751,883

(22) Filed: May 22, 2007

(65) Prior Publication Data
US 2008/0291781 A1    Nov. 27, 2008

(30) Foreign Application Priority Data
Jun. 6, 2006    (EP) .................................. 06290912

(51) Int. Cl.
*G01V 1/00*    (2006.01)
(52) U.S. Cl. ........................................ 367/38
(58) Field of Classification Search .................. 367/38, 367/47, 52, 75
See application file for complete search history.

(56) References Cited

U.S. PATENT DOCUMENTS

| | | | |
|---|---|---|---|
| 6,041,018 A * | 3/2000 | Roche ........................... | 367/46 |
| 7,242,637 B2 * | 7/2007 | Van Den Beukel et al. .... | 367/38 |
| 2007/0247972 A1 * | 10/2007 | Aarre et al. .................... | 367/38 |

FOREIGN PATENT DOCUMENTS

WO    WO2005/066660 A2    7/2005

OTHER PUBLICATIONS

Kolbjornsen et al, "Time match—a method for estimating 4D time shift", Norsk Regnestral Norwegian Computing Center, note no SAND/03/05, Apr. 2005.*

(Continued)

*Primary Examiner*—Jack W. Keith
*Assistant Examiner*—Krystine Saito
(74) *Attorney, Agent, or Firm*—Hirsch Simpson LLC

(57) ABSTRACT

Evolution of an hydrocarbon reservoir in the process of producing is carried out by co-analyzing the changes in the propagation times and seismic amplitudes of a seismic wavelet along propagation paths in the ground. A base survey of the reservoir is provided, with a set of seismic traces at a first time T associated to a first velocity field $V_b$; a monitor survey of the reservoir is provided, the monitor survey being taken at a second time T+ΔT, with a set of seismic traces associated to the same positions as in the base survey; the monitor survey is associated to a second velocity field $V_m$. For a set of points i in the base survey, one computes over the points of the set the sum S of a norm of the difference between

- the amplitude $b_i$ of the seismic trace in the base survey at each point i and
- the sum of the amplitude $m_{i'}$ of the seismic trace at a time-corresponding point i' in the monitor survey and the amplitude due to the reflectivity change local to the time-corresponding point i' induced by the difference between the first velocity field $V_b$ and the second velocity field $V_m$;

the time-corresponding point i' being shifted in time by a time-shift derived from the velocity changes along the propagation path from the surface to time-corresponding point i'. This sum is minimized to characterize the evolution of the hydrocarbon reservoir and derive the velocity changes from the base survey to the monitor survey.

11 Claims, 7 Drawing Sheets

OTHER PUBLICATIONS

European Search Report form EP06290912.

Johnston, DH et al. A Tutorial on Time-Lapse Seismic Reservoir Monitoring, Offshore Technology Conference. Houston, Texas. May 5-8, 1997. 141-146.

Rickett, JE et al. Cross-equalization data processing for time-lapse seismic reservoir monitoring: A case study from the Gulf of Mexico. Geophysics, 2001. vol. 66, No. 4. 1015-1025.

Eiken, O et al. A proven method for acquiring highly repeatable towed streamer seismic data. Geophysics. 2003. vol. 68, No. 4. 1303-1309.

Hall, S.A. et al. Cross-matching with interpreted warping of 3D streamer and 3D ocean-bottom-cable data at Valhall for time-lapse assessment. Geophysical Prospecting. 2005. vol. 53. 283-297.

Kolbjornsen, O et al. Time match—a method for estimating 4D time shift. Norsk Regnesentral. Norwegian Computing Center. 2005. Note NO SAND/03/05. 17 pages.

* cited by examiner

PROCESS AND PROGRAM FOR CHARACTERISING EVOLUTION OF AN OIL RESERVOIR OVER TIME

The present invention relates to the field of geophysics and more particularly to hydrocarbon exploration, such as for example exploration for reservoirs containing oil and/or natural gas.

It is the aim of hydrocarbon exploration to determine the position of hydrocarbon-bearing reservoirs on the basis of the results of geophysical measurements made from the surface or in drilling wells. These measurements typically involve sending a seismic wave into the sub-surface and measuring with a number of sensors the various reflections of the wave off geological structures—surfaces separating distinct materials, faults, etc. (reflection seismic surveying). Other measurements are made from wells. Acoustic waves, gamma radiations or electrical signals are then sent into the sub-surface; again, a number of sensors are used for sensing the reflected signals. Such sensors may be disposed on the ground or at sea.

These techniques typically involve the processing of the measurements so as to construct an image of the sub-surface. This normally requires a model of the velocity of propagation of seismic waves in the sub-surface. Standard imaging velocity packages, such as the one sold by Paradigm (IL) under reference Geodepth make it possible to build such models of the seismic velocity field.

These techniques can be extended to allow observation of the evolution of a given reservoir over time—e.g. before oil production starts and after some period of oil production and to compare the results of measurements. This is called 4D seismic and involves comparing 3D seismic surveys carried out at different time instances. The aim is to observe changes in the state of the reservoir and surrounding formations consequent upon production of hydrocarbons from that reservoir. This generally requires greater care in acquisition than for standard 3D surveys followed by specialised processing steps.

J. E. Rickett & D. E. Lumley, *Cross-equalization data processing for time-lapse seismic reservoir monitoring: A case study from the Gulf of Mexico*, Geophysics, vol. 66 no. 4 (July-August 2001), pp. 1015-1025 discusses the problem of non-repeatable noise in seismic surveys carried out over time. This document discloses the matching of two actual surveys. Pre-migration data were not available. Matching of surveys include matched filtering, amplitude balancing and 3D warping. 3D warping consists in cross-correlating traces within windows to assess movements in x, y and t adapted to optimise matching of data between surveys.

Hall et al., *Cross-matching with interpreted warping of 3D streamer and 3D ocean-bottom-cable data at Valhall for time-lapse assessment*, Geophysical Prospecting, 2005, 53, pp. 283-297 discloses cross-matching of legacy streamer data and newer 3D ocean-bottom cable data, for time-lapse analysis of geomechanical changes due to production in the Valhall field. This document is directed to using results provided by different acquisition methodologies—in the example of the Valhall field, 3D streamer data and 3D ocean-bottom cable. The document indicates that similar migration schemes were used for both surveys. The process involves the steps of
  volumetric shaping, to take into account the different acquisition methodologies;
  amplitude balancing within and between volumes;
  spectral shaping;
  global cross-matching, using a locally derived operator.

Spatial shifts between the two surveys are resolved using 3D warping, in an iterative process.

O. Kolbjornsen & A. R. Syversveen, *Time-match—a method for estimating 4D time shift*, Norks Regnesentral, note no. SAND/03/05, April 2005, discusses a method for estimating time shifts in 4D seismic survey. The algorithm used matches the time in a new survey with the time in the original survey; providing a map from one to the other, on a trace by trace basis. Specifically, matching is carried out by locally compressing and stretching the time axis of, e.g., traces from the monitor survey in order to minimize the squared difference between amplitudes. This note discusses a synthetic test case.

These documents of the prior art teach 3D warping, the realignment of the seismic surveys being compared for compensating both faults in acquisition (or non-repeatability of seismic surveys) and changes in velocity in the sub-surface. One problem with correlation-based approaches is the size of the correlation window. If the window used for correlation is too large, the accuracy of correlation is likely to be affected: indeed, correlation value will then depend not only on differences between the survey at the point being considered, but also on other effects, apart from the points being considered. If the window used for correlation is too small, correlation is likely to be severely affected by noise and non-repeatability of the surveys, including changes due to the effects whose observation is desired.

There is still a need for a process for characterising the evolution of a reservoir in time, which could mitigate this problem.

In an embodiment, the invention therefore provides a process for characterising the evolution of a hydrocarbon reservoir in the process of producing by co-analyzing the changes in the propagation times and seismic amplitudes of a seismic wavelet along propagation paths in the ground, comprising the steps of
  providing a base survey of the reservoir with a set of seismic traces at a first time T associated to a first velocity $V_b$;
  providing a monitor survey of the reservoir, taken at a second time $T+\Delta T$, with a set of seismic traces associated to the same positions as in the base survey, associated to a second velocity $V_m$;
  for a set of points in the base survey, computing the sum S over the points of the set of a norm of the difference between
    the amplitude $b_i$ of the seismic trace in the base survey at said point i and the sum of the amplitude $m_i'$ of the seismic trace at a time-corresponding point i' in the monitor survey and the amplitude due to the reflectivity change local to the said time-corresponding point i' induced by the difference between the first velocity $V_b$ and the second velocity $V_m$;
  wherein the time-corresponding point i' is shifted in time by a time-shift derived from the velocity changes along the propagation path from the surface to said time-corresponding point i';
  characterising the evolution of the hydrocarbon reservoir by minimizing the sum S.

In one embodiment, the amplitude due to reflectivity change local to said time-corresponding point is computed over a time range of one to five times the length of a wavelet used in the surveys.

One may also provide that a corresponding point i' is only shifted in time. In this instance, the step of optimizing may be carried out on a trace by trace basis.

In another embodiment, a corresponding point i' is shifted in time and in space along the propagation path.

The process may further comprise, before the step of computing, the step of zero-offsetting a survey.

In another embodiment, the invention provides a computer program residing on a computer-readable medium, comprising computer program code adapted to run on a computer all the steps of such a process.

The invention will now be further described, by way of non-limiting example to various embodiments, and in reference to the accompanying drawings, where:

Hydrocarbon reservoirs include those containing any hydrocarbon substance, including for example one or more than one of any of the following: oil (often referred to as petroleum), natural gas, gas condensate, tar and bitumen. The following detailed description of various embodiments is presented with primary reference to oil reservoirs, but the principles discussed apply also to situations involving reservoirs containing other hydrocarbon materials, either in addition to oil or instead of oil.

In the rest of this description, one will use the terms "base survey" and "monitor survey" for designating the seismic surveys of the reservoir. The assumption is that the base survey is carried out earlier in time than the monitor survey.

The invention is based on the fact that changes in the reservoir, due to exploitation, will cause changes to the velocity field. Practically, oil will be substituted by gas or water and the fluid pressure will change, causing changes in density and moduli, and thus changes in velocity. These changes to velocity will produce time shifts in the seismic expression of reflectors below these changes and associated changes in reflectivity, causing a change in the local waveform. The invention suggests, in one embodiment, to assess these effects in the monitor survey. This makes it possible to deduce from the comparison of the base and monitor survey a field of velocity changes, without having to proceed with cross correlation of the traces.

This approach is particularly effective where the change in density is expected to be relatively small and the effective reflection angle is small (and/or the expected changes in the shear-wave velocity are also relatively small). For the sake of facilitating computation, it is further advantageous to assume that the time shifts come uniquely from velocity changes and that changes in acquisition or processing parameters are negligible. The latter assumption is increasingly fulfilled in modern, dedicated 4D surveys. The first of these conditions will be fulfilled when the pressure effect on the frame moduli is the dominant time-lapse phenomenon, or, similarly, small amounts of gas are released/introduced into a previously 100% liquid pore fluid. As shown in the examples below, the method is particularly applicable for analysing time warping of the near offset substack.

Figure 1:
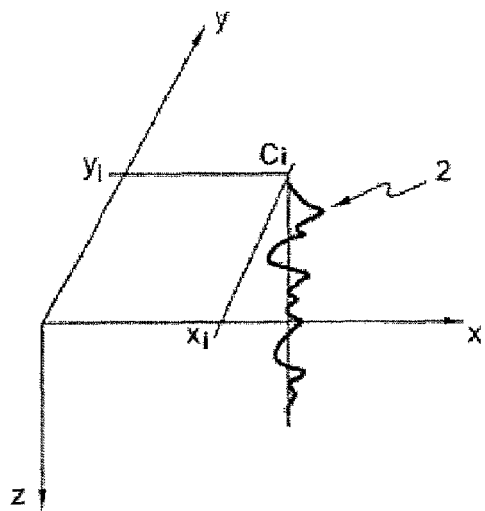
FIG. 1 is a schematic view of a seismic block, showing one trace only for the sake of clarity.

FIG. 1 is a schematic view of a seismic block, showing one trace only for the sake of clarity. The term seismic block is used for describing a set of measurements, over a given geographical field, after processing to produce an image. As known per se, one uses an orthogonal and normalized set of coordinates, in which the x and y axes lie in the horizontal plane. The z-axis, which corresponds to time, is vertical and oriented downward. As usual for seismic surveys, one uses the coordinates (x, y, t) for a temporal representation of the survey, or the coordinates (x, y, z) after depth migration to a spatial representation of the survey. A set of sensors $C_i$ are placed on the ground or at sea, in points of spatial coordinates $(x_i, y_i, z_i)$, i being an integer representative of the sensor number; although much of the literature appears to subscribe to the fiction that $z_i=0$, the sensors are rarely placed exactly at $z_i=0$. Streamers are typically towed at 5-7 m depth, ocean-bottom cables are where the name implies, and even land geophones may sometimes be buried a few meters deep. When a survey is carried out, a raw signal is recorded on each sensor $C_i$; this raw signal is representative of the seismic waves reflected by the various interfaces in the sub-surface. Raw signals received on sensors are then processed to provide an image of the sub-surface comprised of a collection of vertical seismic traces, the vertical axis representing time t or depth z. FIG. 1 shows the axes x, y and t (or z) of the set of coordinates, as well as one sensor $C_i$ with the corresponding trace, referenced 2 on the figure. For the sake of clarity, FIG. 1 only shows one sensor and one trace, while a survey would typically involve many sensors and a number of traces higher than one million. As known per se, seismic processing will place the seismic events as accurately as possible in their true lateral positions, effectively independent of the original positions of the sensors. In the idealised case of zero dip and zero offset, with no lateral velocity gradients, this would indeed place the traces beneath the sensors, but that is a rather special case; traces will be usually conceptually also associated with a location between the actual sensors.

Details on these techniques are available in Özdogan Yilmaz, *Seismic Data Processing*, Society of exploration Geophysicists, 1987.

Figure 2:
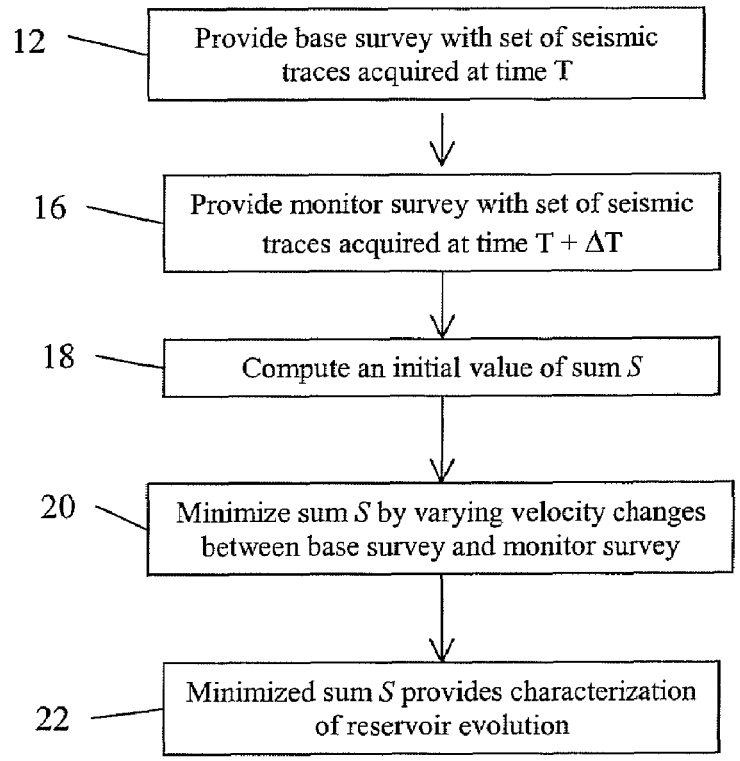
FIG. 2 is a flowchart of a process in one embodiment of the invention.

FIG. 2 is a flowchart of a process according to one embodiment of the invention. In step 12, there is provided a base survey of the reservoir, with a set of seismic traces at a first time T. For a given trace, the base survey provides an amplitude b(t), that is an amplitude function of time t; if the trace is sampled, one simply uses a set of values $t_i$, with i an index having a number of value, typically around 1000 values for a sampling of the trace with a 4 ms sampling period. The trace is then handled as a set of values $b(t_i)$ or $b_i$.

At step 16, one provides a monitor survey of the reservoir, taken at a second time T+ΔT, with a set of seismic traces. In the simplest assumption, ΔT is a positive quantity, and the monitor survey is taken at a time later than the base survey; however, the order in which the surveys are taken is irrelevant to the operation of the process of the invention and, in principle, the time lapse ΔT could as well be negative—which amounts to comparing the earlier survey to the later one. As for the base survey, a sampled trace in the monitor survey is represented as a set of values $m(t_i)$ or $m_i$.

Ideally, the traces in the monitor survey are associated to the same positions as in the base survey. This is carried out by using, inasmuch as possible, the same equipment and the same processes for running the base survey and monitor survey. Practically speaking, a difference of 5-10 m between the positions still leads to acceptable results. Techniques such as interpolation may be used in case traces in the monitor survey and in the base survey do not fulfil this condition (Eiken, O., et al., 2003, *A proven method for acquiring highly repeatable towed streamer seismic data*, Geophysics, 68, 1303-1309.

In this embodiment, the invention results in estimating the relative slowness change, n, where slowness is the reciprocal of velocity, with $$n = -\Delta V/V = (V_b - V_m)/V_b$$

In that formula, $V_b$ and $V_m$ are notionally the local vertical velocities, considered for 3D warping. They do not in general match any velocities used in prior seismic processing, that is migration velocities or stacking velocities. Their difference is indicative of vertical time shifts of seismic events between base and monitor.

This relative slowness change, n, may be assessed in each sample of the seismic block, that is in each sample of a trace. For estimating the relative slowness change, one uses optimization over a set of points, as explained below.

On a given trace, time shift $w_i$ (in units of samples) can be expressed for a given sample i as follows $$w_i = \sum_{k=0}^{i} n_k$$

with $n_k$ the relative slowness change for sample k. This expression is representative of the fact that the time shift $w_i$ for sample i on the trace is caused by velocity changes above the sample. Strictly speaking, the time shift is the integrated change of slowness over the path followed by the signal from the source to the sample being considered and back. The expression given above is based on the assumption that time shifts derive from velocity changes above the sample being considered; this corresponds to a vertical or quasi-vertical propagation path from source to reflector and back to the sensor. This condition is fulfilled at zero offset, that is a distance between the sender and the sensor which is zero or which may be neglected compared to the vertical depth of the reflectors, when the value of dip is zero or is limited; the dip is the angle formed between a horizontal plane and local reflectors. Practically speaking, because we are usually concerned only with propagation through the region where production-related changes are occurring, in the reservoir, these assumptions need only apply over the reservoir thickness; furthermore, "zero" lateral displacement corresponds to remaining within a seismic bin. That is, for a reservoir of thickness around 100 m, and a seismic bin size of 25 m, these assumptions would allow for propagation paths with a lateral displacement of up to 12.5 m between the entry into the reservoir zone (on the way down from the source) and the reflection point, and a similar displacement on the way back up to the sensor, or to a dip of up to 14° for a zero-offset trace. These assumptions may be relaxed further in most cases, where some continuity is expected between bins, and in the context of typical reservoir model grid cells having horizontal dimensions of the order of 100 m.

Under these assumptions, the change in velocity from the base survey to the monitor survey will impact the amplitude in a given trace so that $$b(t_i) = m(t_i + w_i) + \psi * \dot{n}(t_i)$$

where $\psi$ is the seismic wavelet and $\dot{n}(t_i) = n(t_i) - n(t_{i-1})$. The first term is indicative of the time shift induced by velocity changes above sample i under the assumptions given above. The second term is representative of the effect of the local change of reflectivity, consequent upon the velocity change, on the trace; in this second term, local change is considered in a time range commensurate to the wavelet, that is in a time range equal to the duration of the wavelet.

The invention suggests assessing the change in velocity from the base survey to the monitor survey and thus characterising the evolution of the reservoir by assessing the sum, over various points of the base survey, of the norm of the difference $$\Delta_i = b(t_i) - m(t_i + w_i) - \psi * \dot{n}(t_i)$$

This difference $\Delta_i$ is the difference between the amplitude $b_i$ of the seismic trace in the base survey at the point i and the sum of the amplitude $m_{i'}$ of the seismic trace at a time-corresponding point i' in the monitor survey and that amplitude perturbation due to the reflectivity change local to the said time-corresponding point i' induced by the difference between the first velocity $V_b$ and the second velocity $V_m$.

The time-corresponding point i' is shifted in time by a time-shift $w_i$ derived from the velocity changes along the propagation path from the surface to said point i' and back. Implicitly, $t_i$ and $t'_i$ are also expressed in samples.

The sum S of the norm of the difference over the various points $$S = \sum_{i=0}^{N} \|\Delta_i\|$$

is minimized by varying the velocity changes—expressed as the relative slowness changes $n_i$. This provides a field of velocity changes, for the various points. The field of velocity changes parameterises a warping operation for aligning the monitor survey with the base and may also be used for directly characterizing the evolution of the reservoir.

In step 16 of the process of FIG. 2, a set of points is selected; the sum S will be minimized on this set of points. According to computational resources, one may vary the size of the set of points, but these will normally be chosen to completely include the full volume of the reservoir under consideration. In the examples provided below, the traces from the entire base and monitor surveys, windowed in time to span the reservoir, are used. This will provide values of velocity changes over the complete surveys.

In step 18 of the process, an initial value of the sum S is computed.

In step 20 of the process, the sum S is minimized, by varying the values of the relative velocity changes. One example of an optimization technique is provided below; however, one may also use other optimization techniques known per se in the art, such as simulated annealing. If, as suggested above, the traces in the monitor survey are associated to the same positions as in the base survey, points are only time-shifted. One may then carry out the computation on a trace-by-trace basis; in other words, optimization may be carried out separately on each trace. This simplifies computation and makes it easier to run the optimization step as parallel tasks on a number of computers.

In step 22, sum S is minimized, and this provides a value of velocity change for the various points of the set of points over which optimization was carried out. Minimized sum S provides a characterization of the evolution of the reservoir over time.

Minimization in step 20 may be carried out using the Gauss-Newton formula. The Gauss-Newton formula is known per se.

Tests carried out by the applicant suggest that convergence will generally be achieved after 2-4 iterations. It is ascertained that the process will converge if the time shifts amount to less than a half-period of the dominant frequency, as will often be the case. Beyond this value, there may be a risk of converging on local minima. The fact that the above embodiment of the process may converge on a local minimum does not invalidate the method, inasmuch as a correct selection of the initial values of the relative slowness changes, using, e.g., a standard correlation method, such that the remaining shifts are less than a half-period, will allow its subsequent application. Alternatively, the use of a global optimisation approach will ensure convergence toward the true minimum.

In the case where density changes are thought to be non-negligible, but statistically correlated with the velocity changes, the wavelet may be scaled accordingly. For example, if there is a positive correlation such that, on average, a 1% change in velocity implies a 0.25% change in density, the wavelet could be scaled by a factor 1.25 so as to give the most probable representation of the change in the trace resulting from the velocity perturbation.

The process of FIG. 2 was applied to surveys of the Girassol field. The base survey was carried out in the year 1999 by CGG as a high-resolution survey, with sampling of 2 ms. Production started in 2001, and the monitor survey was carried out in the year 2002, using the same equipment as the base survey. Each survey comprises 2.5 million traces, of around 2000 samples each, which were windowed to 500 samples for the application of the method described herein, in the embodiment detailed above. The process of FIG. 2 was carried out using the velocity field originally modelled for the base survey; the velocity field for processing the monitor survey was taken to be the same as that of the base, for the purpose of the time-lapse comparison. Since the base and monitor surveys were carried out under very similar conditions, optimization was carried out on a trace by trace basis. The process was carried out in 20 hours on 60 processors in parallel, that is around 1200 CPU hours; convergence was achieved in 3 iterations in the optimization process.

In the example of FIG. 2, the events represented in the traces in the monitor survey are assumed to be in the same lateral positions as in the base survey. Thus we may consider that changes in the traces are only caused by time shifts, due to the changes in velocity along them (in the zero-offset, zero-dip, assumption) and associated changes in reflectivity. However, the process of the invention also applies where dips are not negligible, so that observed changes in the traces are caused not only by time shift, but also by lateral shifts. In other words, the process of the invention may still be carried out if the lateral positions of the events represented in the traces are perturbed in the monitor survey relative to those in the base survey. In this case, the evaluation of the difference $\Delta_i$ will take the amplitude value from the monitor seismic block which has been displaced not only by a time shift, but also by a change in lateral position. The overall displacements between the migrated images are due to velocity changes along the propagation paths, which are no longer vertical; for a given point i, the corresponding point i' is then shifted in time and in space along the propagation path defined by the migration process which created the images, by an amount which corresponds to the integral, along this path, of the slowness changes. There will also be an amplitude change at i', as before, due to the change in local reflectivity associated with the velocity changes in the neighbourhood of that point. This will require some additional effort, compared to the embodiment previously described, to define these propagation paths and compute the relevant integrals. A similar process may then apply to the non-zero-offset case; even in the case where dips are small, and thus the displacements are mainly vertical, the time shifts are associated with slowness integrals along propagation paths that are largely outside the seismic bin containing the amplitude samples being compared.

FIGS. 3-7 show a 2D synthetic test of the process of FIG. 2; the test was carried out by applying velocity changes to actual data, computing the monitor survey based on the velocity changes, and then applying the process for reconstructing the velocity changes.

Figure 3:
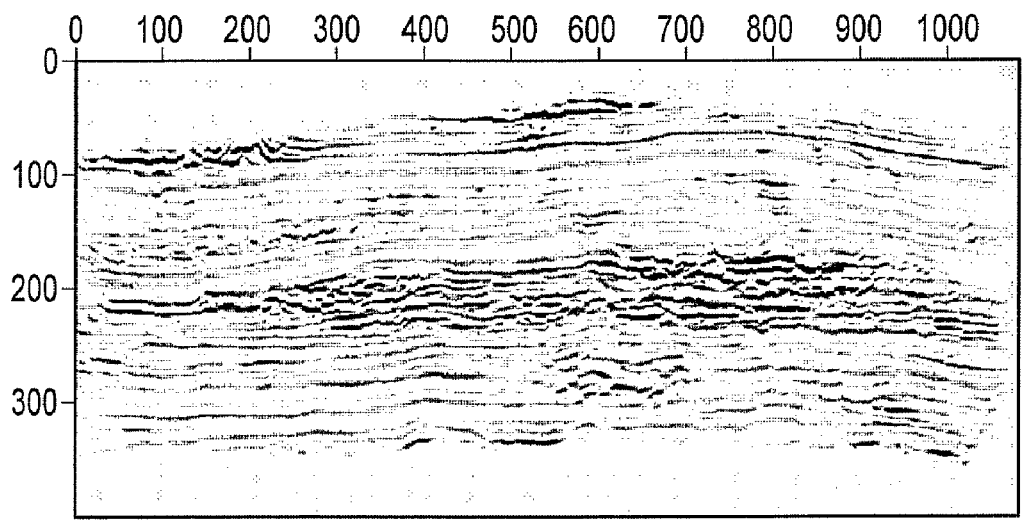
FIG. 3 shows a section of a seismic block used for the base survey in a 2D synthetic test of the process of FIG. 2.

FIG. 3 shows the section of the seismic block used for the base survey. This section is derived from actual data from the Girassol field, obtained by convolutional modelling of the p-wave impedance cube derived by inversion of the base seismic data. As discussed in reference to FIG. 1, the horizontal axis shows the trace numbers—or the distance along the section; the vertical axis represents time. Amplitude appears in FIG. 3 for each trace; one sees that the dip in the reservoir is substantially zero, with maximum values of dip around 3° and mean values of dip in the reservoir around 1.5°.

Figure 4:
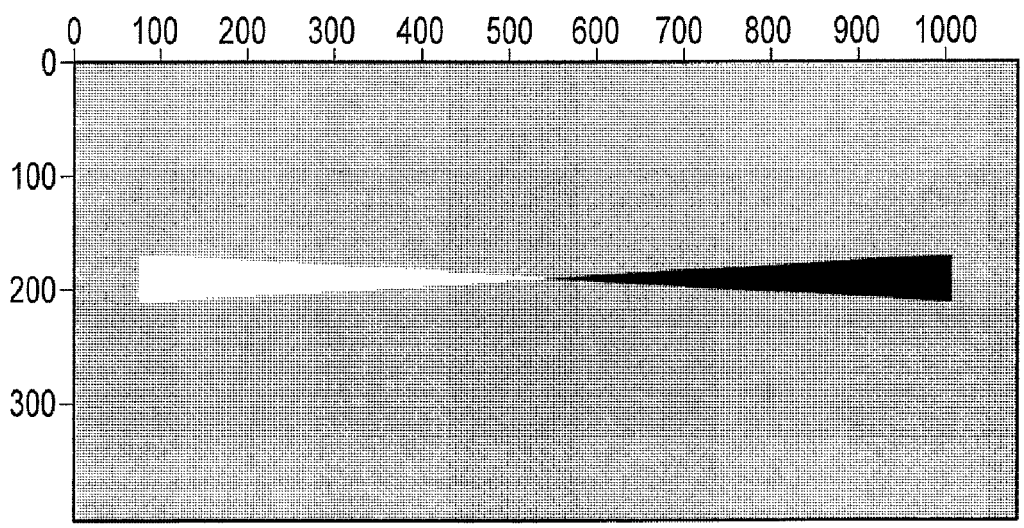
FIG. 4 shows the velocity changes imposed in the synthetic test.

FIG. 4 shows the velocity changes imposed in the synthetic test. The velocity change has a "butterfly", design, which gives easy appreciation of the inversion result and the potential resolution and stability of the method. On the left side of the butterfly, velocity changes are positive, with a constant value of +8%; on the right side of the butterfly, velocity changes are negative, with a constant value of −8%.

Figure 5:
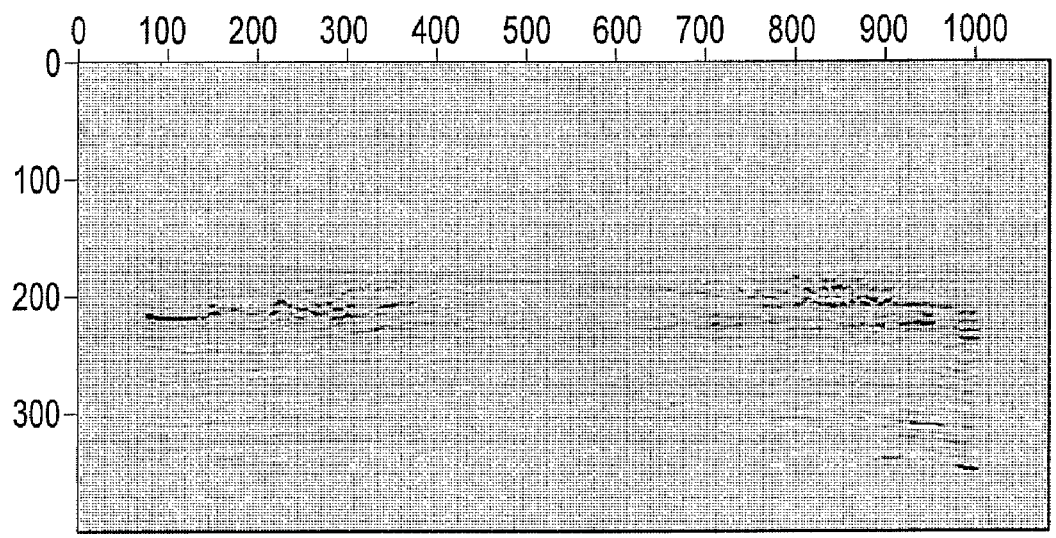
FIG. 5 shows the changes of amplitude caused by the velocity changes of FIG. 4.

FIG. 5 shows the changes of amplitude caused by the velocity changes of FIG. 4. Specifically, FIG. 5 results from
  the computation of changes of amplitude caused in the data of FIG. 3, due to the velocity changes of FIG. 4; the changes are computed using propagation tools, with a velocity field equal to the sum of the base velocity field and of the butterfly changes of FIG. 4;
  the computation of the difference between the computed amplitudes and the amplitudes of FIG. 3.

FIG. 5 shows the effect of time-shift and reflectivity on the amplitudes, being the raw difference between the base and monitor surveys. There is no change in amplitude above the butterfly shape of FIG. 4, since there is no change in velocity. Velocity changes in the butterfly shape cause changes in amplitude due to changes in reflectivity and time-shift. Below the butterfly shape, changes in amplitude are cause by time shift—since local reflectivity is the same.

Figure 6:
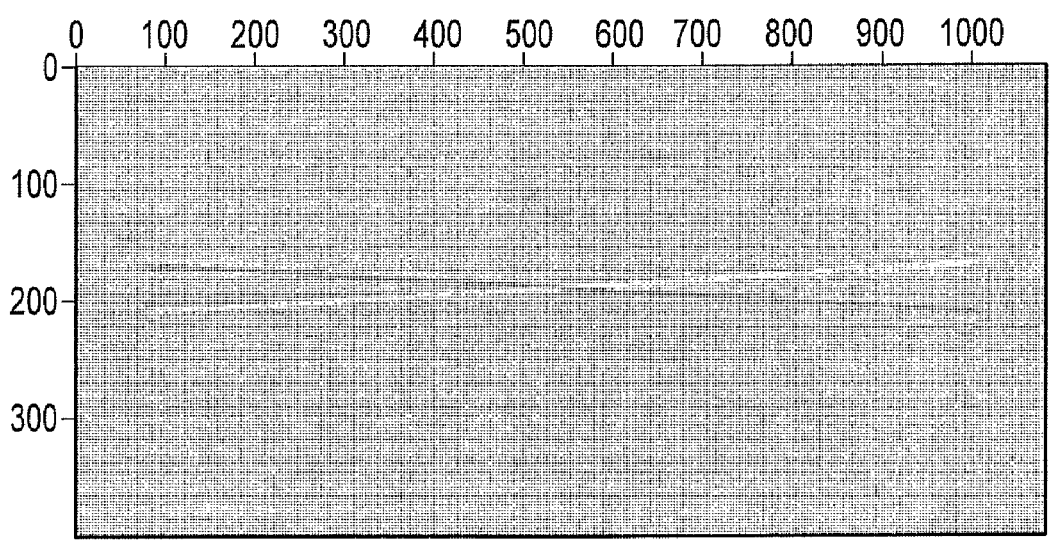
FIG. 6 shows the results of the process of FIG. 2.

FIG. 6 shows the results of the process of FIG. 2. It shows the differences in amplitudes, after minimising sum S, between the base and the shifted monitor surveys, revealing the estimated changes in amplitudes due to the change of reflectivity only. In the example, optimization was carried out on a trace by trace basis, and converged in 3 iterations. FIG. 6 shows that amplitude changes substantially reflect the velocity changes of FIG. 3; this shows the efficacy of the process.

Figure 7:
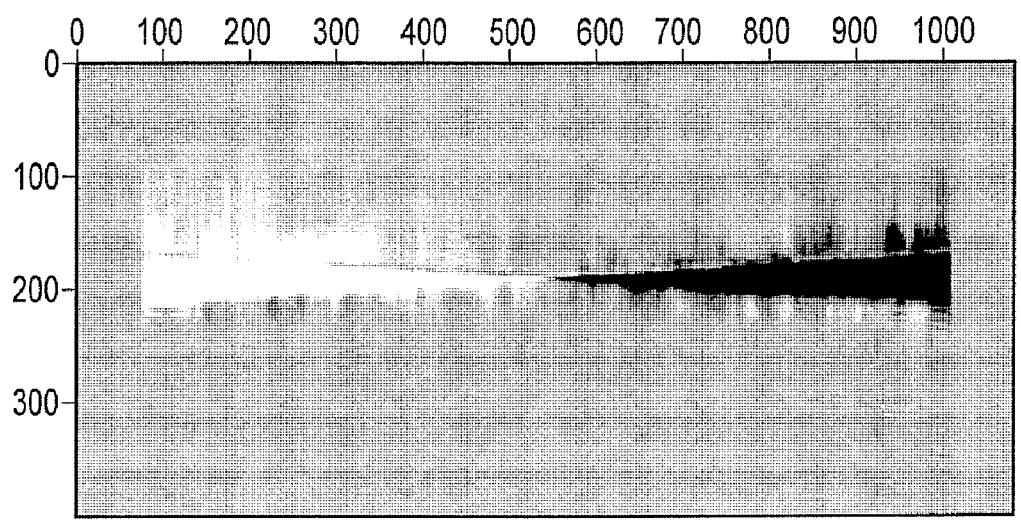
FIG. 7 shows the velocity changes, computed during the process of optimization.

FIG. 7 shows the velocity changes, computed during the process of optimization. Although there remains some errors, FIG. 7 shows that the values of velocity changes are substantially those of FIG. 3. Spectral analysis of the velocity perturbation shows that the inversion has a broad-band nature, with frequencies recovered from 0 Hz out to the upper limit of the seismic spectrum, and thus that the inverted velocity change attribute may be quantitative and easily interpretable.

Figure 8:
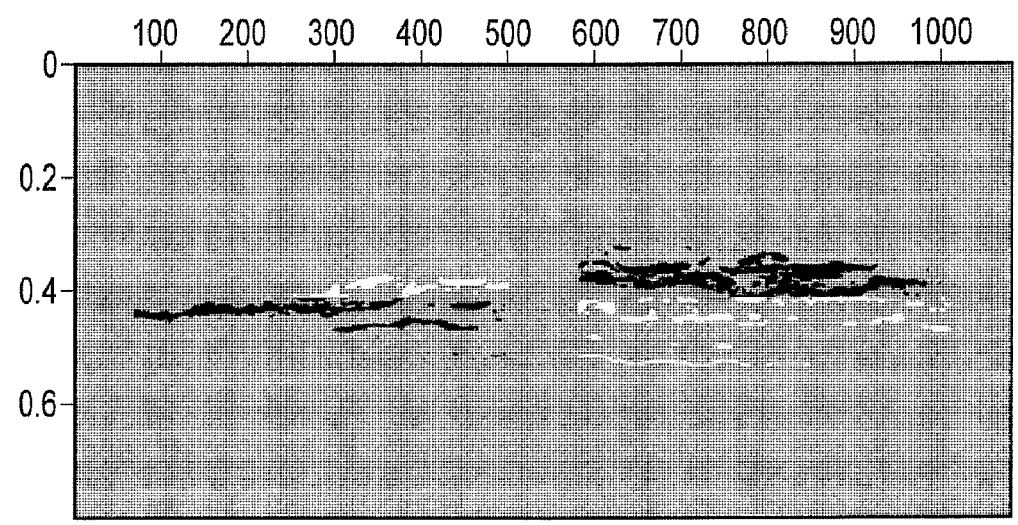
FIG. 8 shows velocity changes places in interpreted sand bodies, for another 2D synthetic test.
Figure 9:
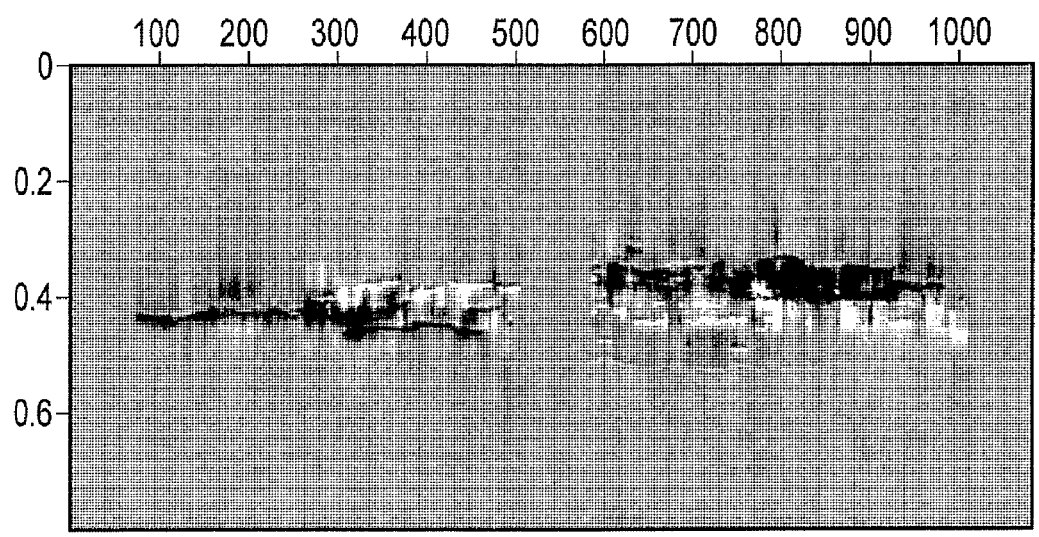
FIG. 9 shows the results obtained in the process of FIG. 2.

FIGS. 8 and 9 show a more realistic 2D synthetic test of the process of FIG. 2; the test was carried out by applying velocity changes to actual data, with more complex velocity changes. Specifically, velocity changes were places in interpreted sand bodies, as shown in FIG. 8. FIG. 9 shows the results obtained in the process of the invention; changes in velocity again substantially correspond to those of FIG. 8. As in the example of FIGS. 3-7, the spectra of the estimated changes confirm the broad-band nature of the calculation. FIGS. 8 and 9 show that the process will also operate on velocity changes more complex that the ones of FIG. 3.

Figure 10:
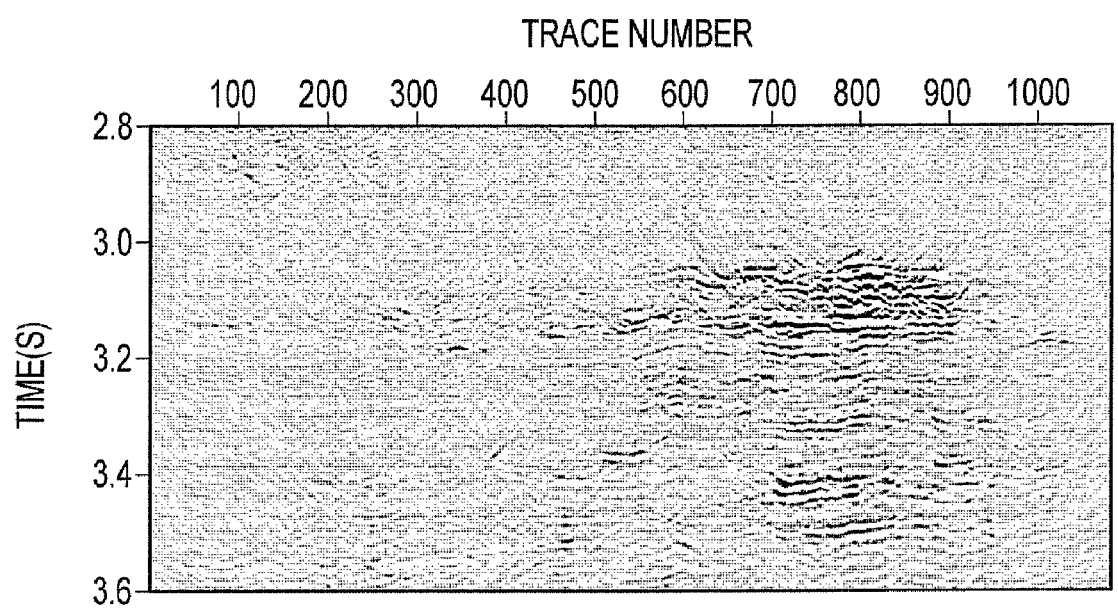
FIG. 10 is a section of the raw differences between the monitor survey and base survey in an actual example.
Figure 11:
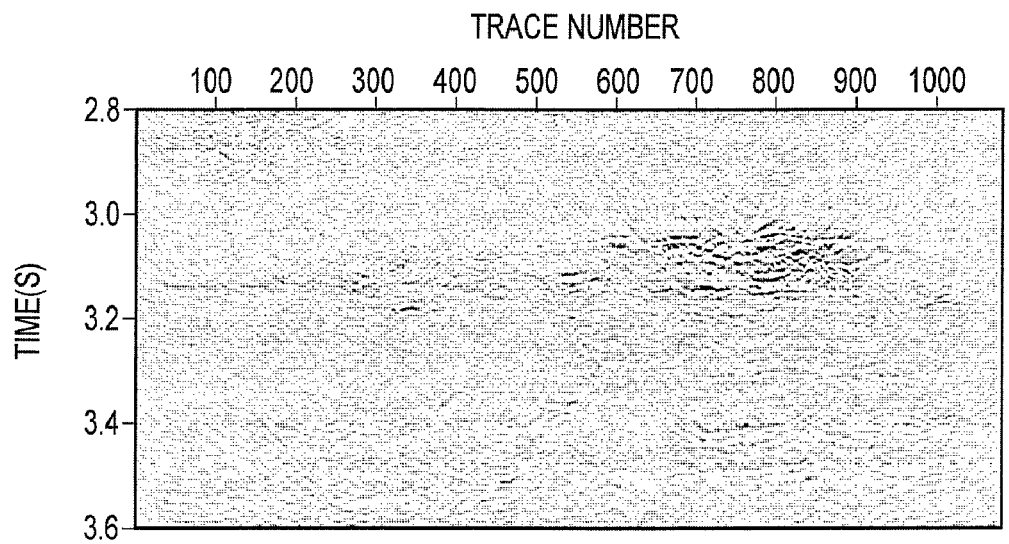
FIG. 11 shows the seismic amplitude difference computed according to the process of FIG. 2.
Figure 12:
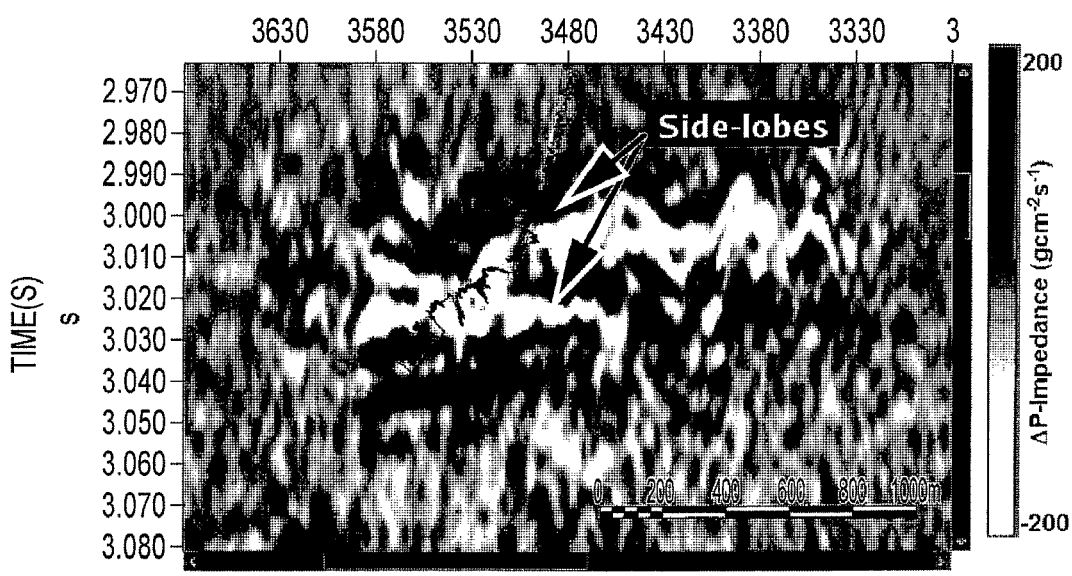
FIG. 12 shows the impedance difference estimated by a leading contractor in the same region.
Figure 13:
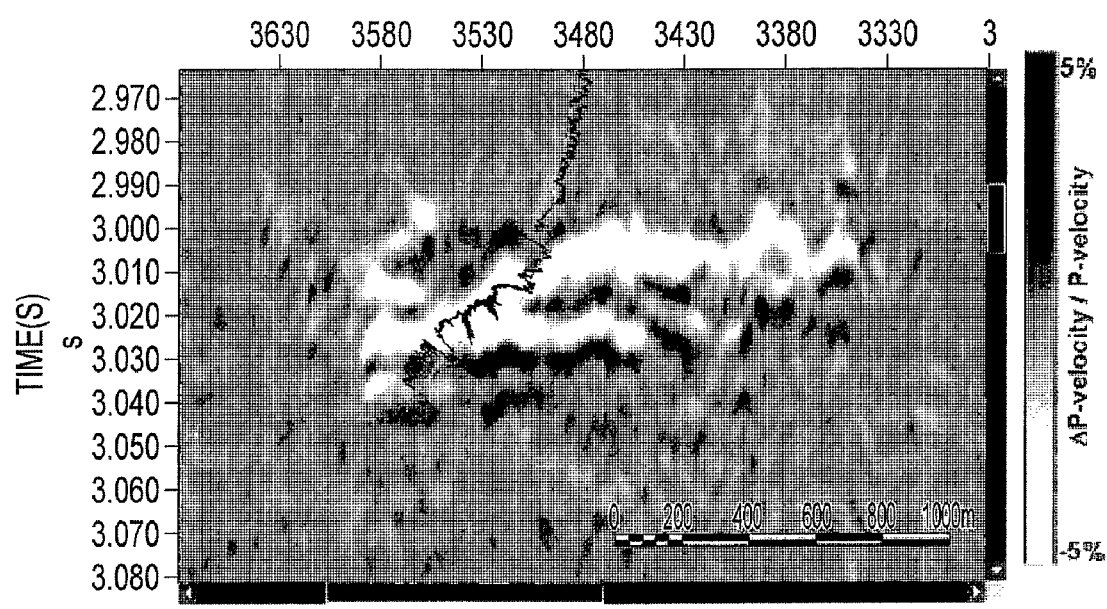
FIG. 13 shows the proportional velocity changes in part of the section of FIGS. 10 and 11.

FIGS. 10-13 show the results obtained thanks to the process of FIG. 2, on the actual surveys for the Girassol field. FIG. 10 is a section of the raw differences between the monitor survey and base survey, on Girassol fast-track near substacks; FIG. 10 is taken along crossline 4001 of the survey. FIG. 11 shows the seismic amplitude difference computed in the process of FIG. 2; compared to FIG. 10, one can see that the differences are now for the major part visible in the upper part of the section; this part corresponds to the portions of the reservoir wherefrom oil is being retrieved. In the lower part of the reservoir, differences in amplitude are much lower in the section of FIG. 11 than in the section of FIG. 10; this is caused by the fact that the process of FIG. 2 takes into account time shifts created in the upper lever. FIG. 13 shows the proportional velocity changes in part of the section of FIGS. 10 and 11 near a well, as estimated in the optimization process of FIG. 2; this may be compared with FIG. 12, which shows the impedance difference estimated by a leading contractor in the same region. The improvement in interpretability arising from the broad-band nature of the velocity-change attribute is clear, and our confidence in the quantitative values of the attribute is accordingly enhanced. FIG. 13, by the absence of noise, also demonstrates the stability with which the velocity change attribute may be calculated by this approach, which we believe to be considerably improved in comparison with calculations based on the other approaches cited above.

The example of FIGS. 10-13 shows that the process of the invention provides results that are immediately usable and are also in accordance with exploration data. Spectral analysis of the data of FIGS. 10-12 also shows, as in the previous examples, that lower frequencies are well recovered.

The example of FIGS. 10-12 is carried out on the Girassol near substacks, where the average incidence angles amount to 12 degrees; therefore, even though the warp displacements may be vertical, they are not exactly equal to the vertical integral of the superposed slowness changes; the example of FIGS. 10-12 still demonstrates that the assumption of zero-offset and zero dip still provides results that are representative of actual exploration data.

The process of the invention may be embodied in a computer program. The program is adapted to receive data for the base and monitor surveys, as well as data for the velocity fields; such data are in the format provided by state of the art computer packages such as those discussed above. The program runs the various steps of the process of FIG. 2.

The invention claimed is:

1. A process for characterising sub-surface evolution of a hydrocarbon reservoir in the process of producing by co-analyzing changes in the propagation times and seismic amplitudes of a seismic wavelet along propagation paths in the ground, the process comprising:
   providing a base seismic survey conducted on the reservoir at a first time T and comprising a set of seismic traces at the first time T associated to a first velocity $V_b$, the seismic traces representing an image of the sub-surface at the first time T;
   providing a monitor seismic survey conducted on the reservoir at a second time T+$\Delta$T after a period of production of hydrocarbons from the reservoir and comprising a set of seismic traces at the second time T+$\Delta$T associated to the same positions as in the base survey and associated to a second velocity $V_m$, the seismic traces representing an image of the sub-surface at the second time T+$\Delta$T;
   for a set of points in the base survey, computing a sum S over the points of the set of a norm of the difference between
      an amplitude $b_i$ of a seismic trace in the base survey at a point i and
      a sum of an amplitude $m_{i'}$ of a seismic trace at a time-corresponding point i' in the monitor survey and an amplitude due to reflectivity change local to the time-corresponding point i' induced by relative change in the velocity of the earth in and around the reservoir between the first time T and the second time T+$\Delta$T;
   wherein the time-corresponding point i' is shifted in time by a time-shift derived from velocity changes along a propagation path from a surface to the time-corresponding point i';
   characterising the evolution of the hydrocarbon reservoir between the first time T and the second time T+$\Delta$T by minimizing the sum S, wherein the evolution represents changes in the state of the reservoir consequent upon production of hydrocarbons from the reservoir between the first time T and the second time T+$\Delta$T.

2. The process of claim 1, wherein the amplitude due to reflectivity change local to the time-corresponding point i' is computed over a time range of one to five times the length of a wavelet used in the surveys.

3. The process of claim 1, wherein the time-corresponding point i' is shifted only in time.

4. The process of claim 3, wherein the step of minimizing the sum S is carried out on a trace by trace basis.

5. The process of claim 1, wherein the time-corresponding point i' is shifted in time and in space along the propagation path.

6. The process of claim 1, further comprising before the step of computing, the step of zero-offsetting a survey.

7. The process of claim 1, wherein the hydrocarbon reservoir comprises oil.

8. A computer program residing on a computer-readable medium, comprising computer program code adapted to run on a computer all the steps of a process for characterising the evolution of a hydrocarbon reservoir in the process of producing by co-analyzing the changes in the propagation times and seismic amplitudes of a seismic wavelet along propagation paths in the ground, the process comprising:
   providing a base survey of the hydrocarbon reservoir with a set of seismic traces at a first time T associated to a first velocity $V_b$;
   providing a monitor survey of the hydrocarbon reservoir, taken at a second time T+$\Delta$T, with a set of seismic traces associated to the same positions as in the base survey, associated to a second velocity $V_m$;

for a set of points in the base survey, computing a sum S over the points of the set of a norm of the difference between an amplitude $b_i$ of a seismic trace in the base survey at a point i and a sum of an amplitude $m_{i'}$ of the seismic trace at a time-corresponding point i' in the monitor survey and an amplitude due to reflectivity change local to the time-corresponding point i' induced by a relative change in the velocity of the earth in and around the reservoir (difference between the first velocity $V_b$ and the second velocity $V_m$);

wherein the time-corresponding point i' is shifted in time by a time-shift derived from the velocity changes along the propagation path from the surface to the time-corresponding point i';

characterising the evolution of the hydrocarbon reservoir by minimizing the sum S.

9. The process of claim 1, wherein the characterizing comprises portraying the evolution of the hydrocarbon reservoir as a visual image representation of the sub-surface showing changes to the reservoir between first time T and second time T+ΔT.

10. The process of claim 9, wherein the visual image represents differences in seismic amplitude in the sub-surface.

11. A computer program residing on a computer-readable medium, comprising computer program code adapted to run on a computer all the steps of the process according to claim 1.

* * * * *